United States Patent [19]

Takizawa

[11] Patent Number: 4,691,812

[45] Date of Patent: Sep. 8, 1987

[54] APPARATUS FOR CONTROLLING LOCK-UP CLUTCH OF LOCK-UP TYPE AUTOMATIC TRANSMISSION OF AUTOMOBILE

[75] Inventor: Satoshi Takizawa, Yokosuka, Japan

[73] Assignee: Nissan Motor Co., Ltd., Yokohama, Japan

[21] Appl. No.: 852,240

[22] Filed: Apr. 15, 1986

[30] Foreign Application Priority Data

Apr. 23, 1985 [JP] Japan .................................. 60-85309

[51] Int. Cl.⁴ ....................... F16D 47/06; B60K 41/22
[52] U.S. Cl. .................................... 192/3.3; 192/3.31; 364/424.1
[58] Field of Search ....................... 192/3.28, 3.29, 3.3, 192/3.31; 340/602; 364/424.1

[56] References Cited

U.S. PATENT DOCUMENTS

| | | | |
|---|---|---|---|
| 4,431,095 | 2/1984 | Suga | 192/3.31 |
| 4,499,979 | 2/1985 | Suzuki et al. | 192/3.31 |
| 4,527,105 | 7/1985 | Shiraishi | 318/444 |
| 4,542,325 | 9/1985 | Kobayashi et al. | 318/444 X |
| 4,603,316 | 7/1986 | Kobayashi et al. | 340/52 R |

FOREIGN PATENT DOCUMENTS

| | | | |
|---|---|---|---|
| 109854 | 8/1980 | Japan | 192/3.31 |
| 59-43664 | 10/1984 | Japan . | |
| 59-43666 | 10/1984 | Japan . | |
| 60-2549 | 1/1985 | Japan . | |
| 60-2550 | 1/1985 | Japan . | |
| 101356 | 6/1985 | Japan | 192/3.3 |

Primary Examiner—Rodney H. Bonck
Attorney, Agent, or Firm—Schwartz, Jeffery, Schwaab, Mack, Blumenthal & Evans

[57] ABSTRACT

A lock-up control is provided which is designed to control engagement of a lock-up clutch of a lock-up type torque converter of an automatic transmission. According to this lock-up control, a road surface condition which provides a low friction coefficient is detected and the engagement of the lock-up clutch is prohibited when the road surface condition is detected.

9 Claims, 12 Drawing Figures

APPARATUS FOR CONTROLLING LOCK-UP CLUTCH OF LOCK-UP TYPE AUTOMATIC TRANSMISSION OF AUTOMOBILE

BACKGROUND OF THE INVENTION

1. Field of the Invention

The present invention relates to an apparatus for controlling a lock-up clutch of a lock-up type torue converter f an automatic transmission, and more particularly to an apparatus for controlling engagement-/disengagement of a lock-up clutch of a lock-up type torque converter of an automatic transmission in response to a change in surface condition of road which an automobile installed with the automatic transmission is running through.

2. Description of Prior Art

The lock-up type torque converters have been developed for the purpose of preventing a drop in power transmission efficiency through the torque converters which would occur during operation at high vehicle speeds. There have been a various kinds of proposal regarding lock-up control.

JP-PS No. 60-2549, which corresponds to U.S. Pat. No. 4,431,095, discloses a lock-up type automatic transmission wherein a lock-up clutch is engaged as long as a vehicle speed attains a predetermined relationship with one of predetermined vehicle speed values which is selected for a gear ratio established although the engagement of the lock-up clutch is temporarily released during shifting operation.

JP-PS No. 60-2550, which corresponds to U.S. Pat. No. 4,499,979, discloses a lock-up control system wherein a similar lock-up control is carried out based on result of comparison of an actual vehicle speed with a predetermined so-called "lock-up vehicle speed," the actual vehicle speed being indicated by content of a counter which counts sensor pulses having a frequency variable with the vehicle speed within a time interval between adjacent two clock pulses.

JP-PS No. 59-43664 discloses a lock-up type automatic transmission wherein engagement of a lock-up clutch is released immediately after a brake pedal has been depressed. This control is intended to prevent stalling of an engine which might be caused if the lock-up clutch were kept engaged.

JP-PS No. 59-43666 discloses a lock-up type automatic transmission wherein engagement of a lock-up clutch is released only when the vehicle is subject to rapid deceleration.

However, the above mentioned various kinds of proposal according to the prior art cannot cope with a change in road surface condition that affects friction coefficient between road surface and road wheels of an automobile.

The road surface condition varies and there may occur stalling of the engine if the road wheels lose traction and lock up during braking operation under conditions where the vehicle is travelling through wet road with the lock-up clutch kept engaged. this is because there is no slip between the engine and the braked wheels and thus the braked wheels bring the engine to a stall when they lock up.

A task of the present invention is to improve a lock-up control such that engagement of a lock-up clutch is prohibited so as to prevent stalling of an engine which otherwise would occur if braked wheels lock up on road surface condition where the wheels tend to lose traction.

SUMMARY OF THE INVENTION

According to the present invention, the friction coefficient between a road surface and road wheels is used as a standard on which judgement whether engagement of the lock-up clutch is released is based.

More specifically, a road surface condition which provides a friction coefficient less than a predetermined level is detected directly or indirectly, and the engagement of a lock-up clutch is prohibited.

According to embodiments of the invention, the task of the invention is accomplished without additional provision of any sensor or device that is designed to directly detect the frictional coefficient between a road surface and road wheels.

DESCRIPTION OF THE PREFERRED EMBODIMENTS

Figure 1A:
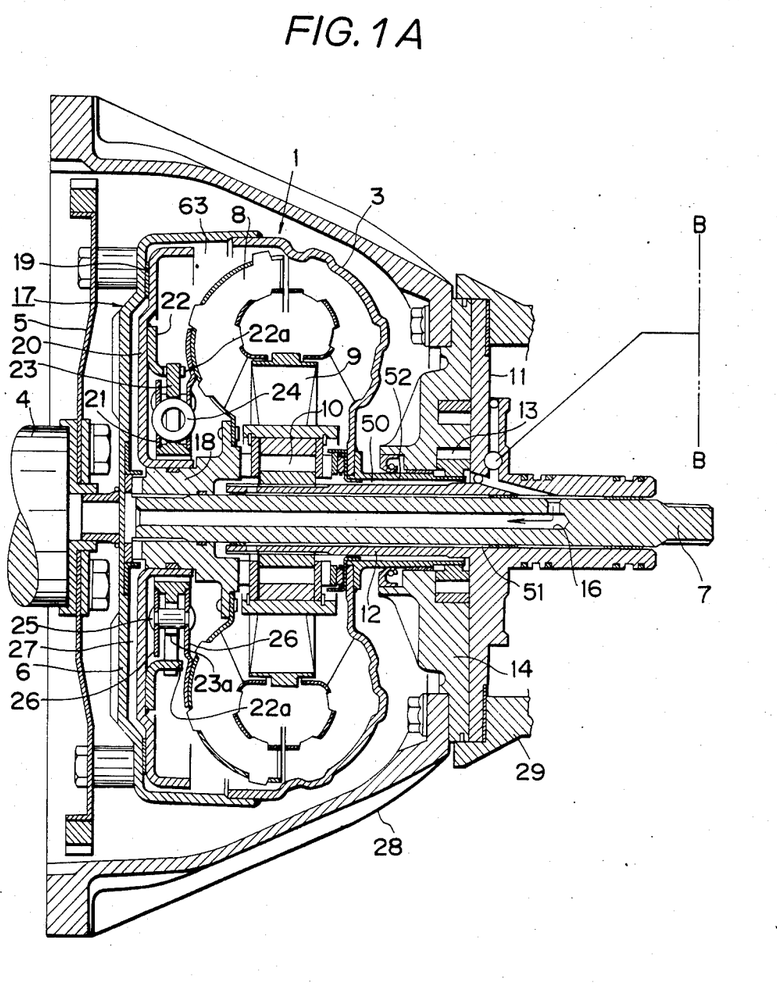
FIGS. 1A and 1B, when combined, constitute a sectional view of a lock-up type torque converter of an automatic transmission of an automobile, in operative association with a lock-up control valve and a lock-up solenoid which are diagrammatically illustrated.
Figure 1B:
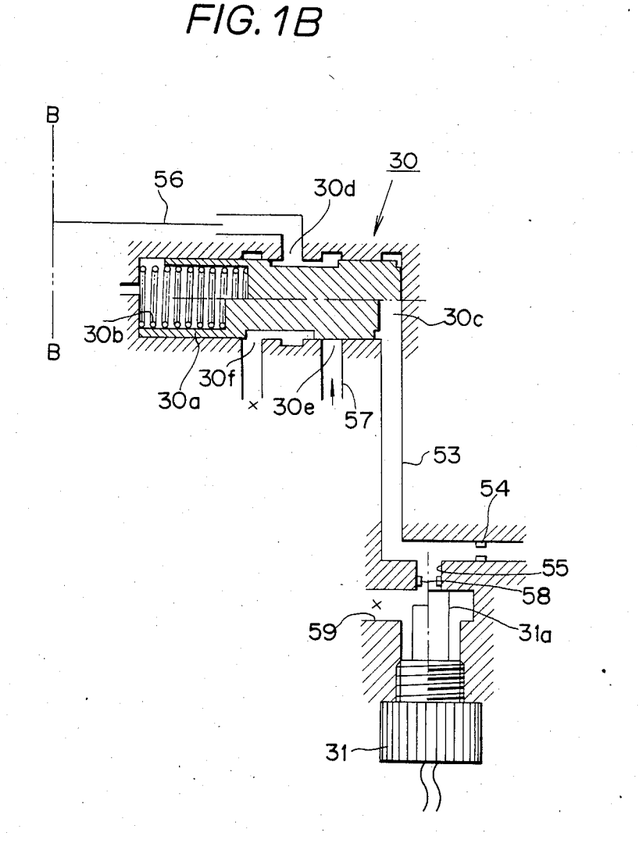

Referring to FIGS. 1A and 1B, a lock-up type torque converter 1 is shown as drivingly connected to a crankshaft 4 of an internal combustion and also to a transmission input shaft 7 in the conventional manner. The torque converter 1 includes a lock-up clutch 17 which is engaged or released under the control of a lock-up control valve 30 that is shiftable in response to ON/-OFF of a solenoid valve 31. The detailed description of FIGS. 1A and 1B is found in the U.S. Pat. No. 4,431,095 issued to Suga on Feb. 14, 1984 which disclosure is hereby incorporated by reference (see particularly, FIGS. 3A and 3B)

Briefly, when the solenoid valve 31 is turned OFF or not energized, its plunger 31a opens a branch passage 55 to connect same to a drain port 59. This causes a rear clutch actuating pressure within a passage 53 to disappear, thus allowing a spool 30a of the lock-up control valve 31 tomove to the right as viewed in FIG. 1B under the action of a return spring 30b to assume a position as illustrated by an upper half thereof where torque converter interior pressure within a passage 57 is supplied to a lock-up chamber 27 through ports 30e, 30d, passage 56, and passage 16. This causes disengagement of a lock-up clutch piston 20 from a radial wall of a torque converter cover 6, releasing engagement of the lock-up clutch 17. Thus, the torque converter operates with a slip between a pump impeller 3 and a turbine runner 8.

Energization of the solenoid valve 31 causes the plunger 31a to close the branch passage 55. This causes the rear clutch actuating pressure to be supplied to a chamber 30c of the lock-up control valve 30, urging the spood 30a against the return spring 30b to move to a position as illustrated by a lower half thereof in FIG. 1B. In this position of the spool 30a, the hydraulic fluid is discharged from the lock-up chamber 27 to a drain port 30f of the lock-up control valve 30.

Figure 2:
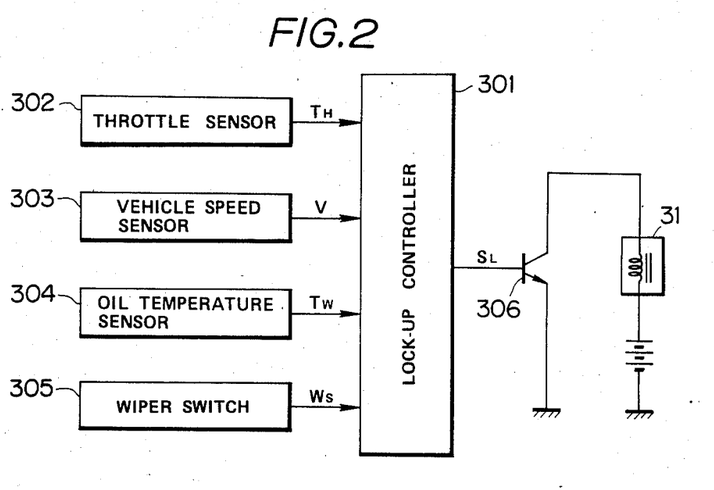
FIG. 2 is a block diagram showing main components of a first embodiment according to the present invention.

Referring to FIG. 2, a microcomputer based lock-up controller 301 receives information signals from a throttle sensor 302, a vehicle speed sensor 303, an oil temperature sensor 304, and a wiper switch 305, and it generates a lock-up control signal $S_L$. The lock-up control signal $S_L$ is supplied to a driver transistor 306 to energize same. When energized, current is supplied to the lock-up solenoid 31. The throttle sensor 302 generates a throttle opening degree indicative signal $T_H$, the vehicle speed sensor 303 generates a vehicle speed indicative signal V, the oil temperature sensor 304 measures oil temperature within the torque converter 1 and generates an oil temperature indicative signal $T_W$. The wiper switch 305, which is ususally mounted to the automobile for turning ON/OFF a wiper motor which drives window shield wiper assembly, has a rest (OFF) position and a predetermined operation (ON) position. The output $W_S$ indicative of the predetermined operation position of the wiper switch 305 is supplied to the lock-up controller 301.

Figure 3:
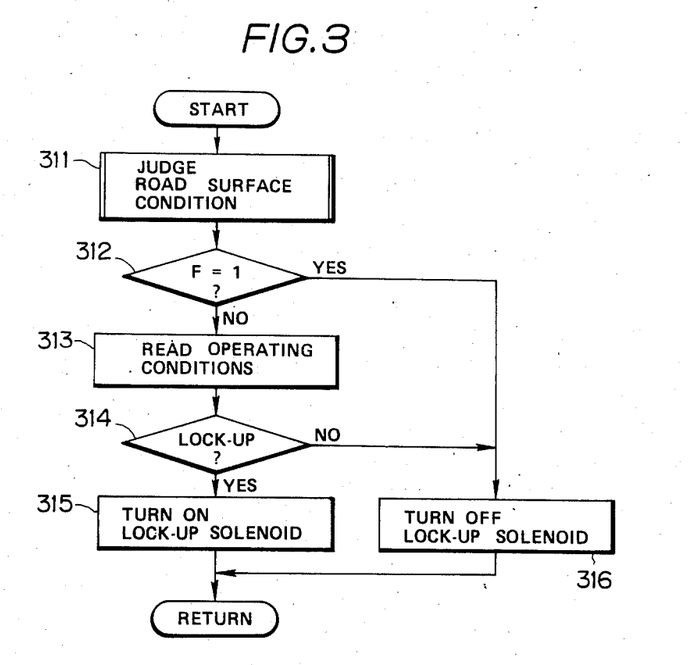
FIG. 3 is a flowchart illustrating jobs executed by a lock-up controller shown in FIG. 2.

Referring to FIG. 3, jobs executed by the controller 301 are described.

The execution of jobs illustrated by the flowchart in FIG. 3 is repeated after lapse of a predetermined period of time. First of all, the process of judging road surface condition is executed at a block 311. This process is described in detail with reference to FIG. 4.

Figure 4:
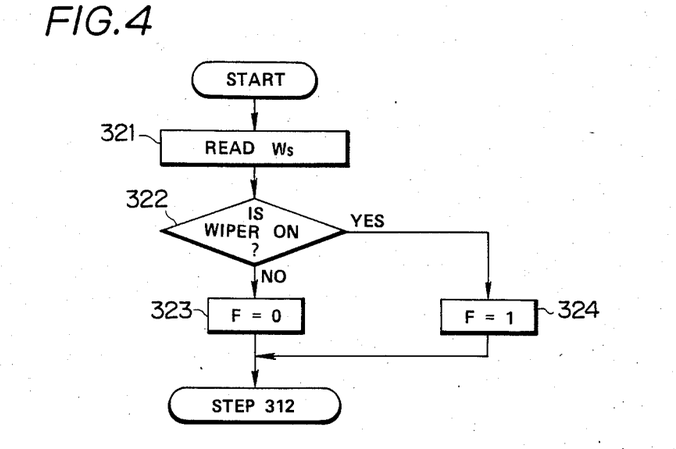
FIG. 4 is a flowchart illustrating jobs to be executed in judging road surface condition.

Referring to FIG. 4, the signal $W_S$ supplied by the wiper switch 305 is read at step 321. Since the signal $W_S$ is indicative of the predetermined operation position assumed by the wiper switch 305, a decision is made, at step 322, based on this signal $W_S$ whether the wiper is operating. If the wiper is operating, a judgement flag F is set, i.e., F=1, at step 324. On the contrary, if the wiper is not operating, the judgement flag F is reset, i.e., F=0, at step 323.

This judgement is based on the assumption that, when the wiper is operating, it is raining and thus road surface is wet to provide a road surface condition where friction coefficient is less than a predetermined level that is provided by the road surface when it is dry surface. The state F=1 represents the friction coefficient being less than the predetermined level, whereas the state F=0 represents the friction coefficient being greater than the predetermined level.

Referring back to FIG. 3, a decision is made at step 312 whether the flag F is set. If the flag F is reset, operating conditions are read at step 313 and a decision is made whether the lock-up clutch 17 should be engaged at step 314. If the operating codnitions demand the lock-u, the lock-up control signal $S_L$ is raised to a H (High) level to cause the transistor 306 to turn ON the lock-up solenoid 31 at step 315. If the operating conditions do not demand the lock-up, the lock-up control signal $S_L$ remains or lowered to a L (Low) level, causing the transistor 306 to stop current supply to the lock-up solenoid 31 at step 316.

Although not specifically described here, the vehicle speed signal V is compared with a lock-up vehicle speed that is subject to variation with the throttle opening degree signal $T_H$ and oil temperature signal $T_W$ and when the vehicle speed V satisfies a predetermined relationship with the lock-up vehicle speed, it is judged that the operating conditions demand the lock-up clutch 17 be engaged. In order to more clearly understand the way about this judgement, reference should be made to U.S. Pat. Nos. 4,431,095 or 4,499,979 issued to Suzuki et al. on Feb. 19, 1985.

If the decision at step 312 is turned out to be YES, the supply of current to the lock-up solenoid 31 is cut off at step 316 even under the operating conditions which demand the lock-up of the lock-up type torque converter 1. Since the decision at step 312 is given priority, the engagement of the lock-up clutch 17 is prohibited whenever it is judged that the road surface condition provides low friction coefficient after seeing the flag F being set (F=1).

It will now be appreciated that, according to this embodiment, since the engagement of the lock-up clutch 17 is prohibited and the torue converter 1 provides a slip between the engine and the road wheels of the automobile, the engine is prevented from being subject to excessive brake force when the braked road wheels lose traction with the road surface and lock up.

Figure 5:
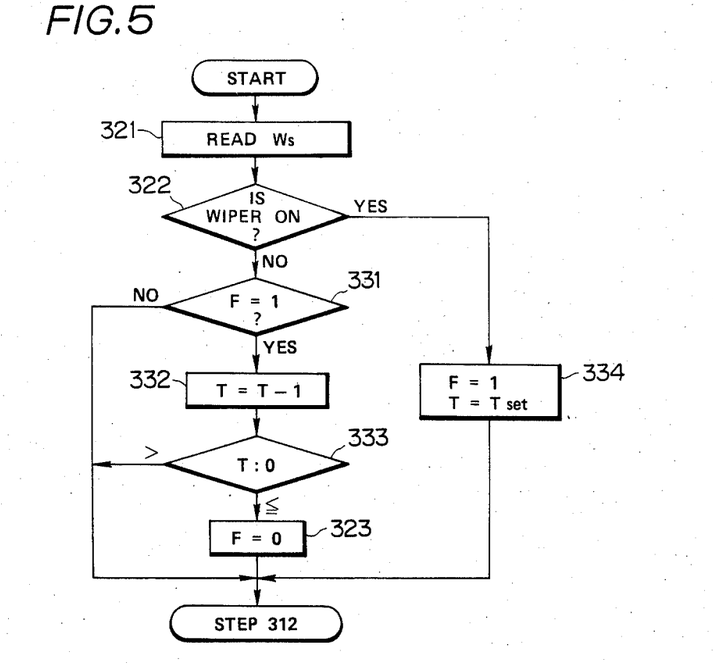
FIG. 5 is a flowchart similar to FIG. 4 illustrating a modification.

Referring to FIG. 5, there is described an example which is considered to be more preferrable than the process shown in FIG. 4. The same reference numerals are used to designate similar steps to those shown n FIG. 4 for simplicity of explanation.

Figure 6:
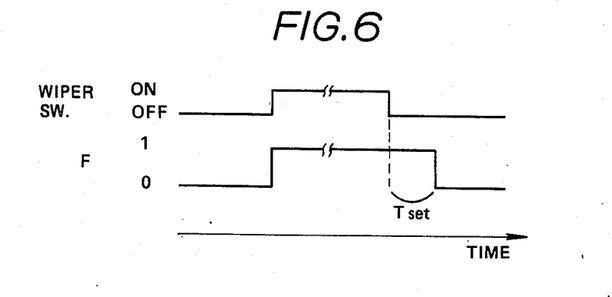
FIG. 6 is a timing diagram illustrating the relationship between an ON/OFF position (i.e., an operation/rest position) assumed by wiper switch and a SET/RESET state of a judgement flag F which results from operation along the flowchart shown in FIG. 5.

Referring to FIG. 5 as well as FIG. 6, there are added steps 334, 331, 332, and 333 in order to reset the flag F after lapse of a predetermined delay Tset after the wiper switch 305 has assumed its rest (OFF) position, provided that the wiper switch continues to stay OFF during this delay. The delay Tset is set to the timer T and flag F is set at step 324 after a decision has been made at step 322 that the wiper is operating. Immediately after the wiper switch 305 has been turned OFF to assume the rest position, the decision made at step 322 turns out to be NO, causing step 331 to be executed where a decision is made whether the flag F is set. Since, now, the flag F is set, the timer T is decreased by 1 at step 332, and then the timer T is compared with 0 (zero) at step 333. As long as the timer T is greater than 0 (zero), the process proceeds to step 312 shown in FIG. 3 with the flag F left set. Let it be assumed that the wiper switch 305 continues to stay in the rest (OFF) position, the process along the steps 331, 332, 333, and 312 continue until the timer T fails to be greater than 0 (zero). When the timer T fails to be greater than 0 (zero) after the wiper has remained out of operaton for the predetermined time Tset, the flag F is reset at step 323 before the process goes to step 312. During the run which follows immediately after the flag F has been reset at ste 323, the process goes from step 331 to step 312 directly after the execution of step 322 if the wiper is not operating.

Although in the embodiment shown in FIG. 2, the output signal $W_S$ of the wiper switch 305 is used as a standard on which the judgment whether the road surface condition provides a friction coefficient less than the predetermined level is based, the output $V_C$ of a rain drop sensor 308 mounted to an engine hood of an automobile may be used instead of the output $W_S$. This will be further described in connection with FIGS. 7 and 8 as well as FIG. 3.

Figure 7:
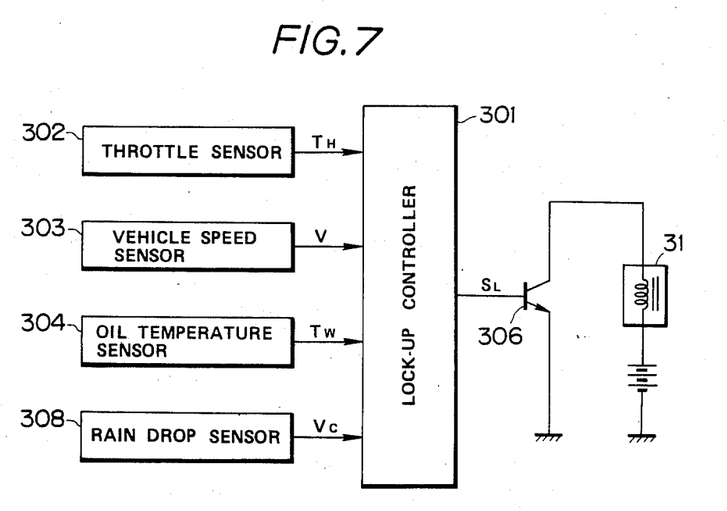
FIG. 7 is a block diagram similar to FIG. 2 showing main components of a second embodiment.

Referring to FIG. 7, a microcomputer based lock-up controller 301 receives information signals from a throttle sensor 302, a vehicle speed sensor 303, and an oil temperature sensor 304, and it generates a lock-up control signal $S_L$ in a manner similar to FIG. 2 except that the rain drop sensor 308 has replaced the wiper switch 305. The rain drop sensor 308 senses the intensity and frequency of rain impinging thereon and generates an output signal $V_C$ indicative of the amount of rain. It is used in a well known rain condition dependent wiper control system which is designed to swing the wiper assembly intermittently with a period $T_O$ which is variable in response to the output signal $V_C$.

Such a rain condition dependent wiper control system is disclosed in U.S. Pat. application Nos. 527,776, filed on Aug. 30, 1983, (now U.S. Pat. No. 4,527,105), 574,272 filed on Jan. 26, 1984, (now U.S. Pat. No. 4,542,325), and 574,142 filed on Jan. 26, 1984, (now U.S. Pat. No. 4,603,316), all of which have been commonly assigned herewith and are hereby incorporated by reference.

Figure 8:
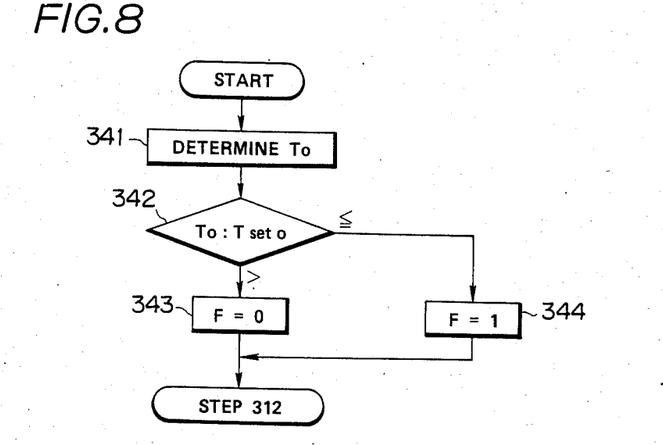
FIG. 8 is a flowchart similar to FIG. 4 illustrating jobs executed in judging road surface condition.

Referring to FIG. 8, the lock-up controller 301 determines the period $T_0$ based on the output signal $V_C$ of the rain drop sensor 8 at step 341. The period $T_0$ thus determined is compared with a predetermined value $Tset_0$ at step 342.

If $T_0$ is not greater than $Tset_0$, it is judged that road surface provides a low friction coefficient because the period $T_0$ with which the wiper is operating is short, reflecting the situation that it is raining hard to a degree such that road surface is covered with rain water. Thus, a judgement flag F is set at step 344.

If $T_0$ is greater than $Tset_0$, it is judged that it is not raining hard or it is not raining because the period $T_0$ is long or the wiper is not in operation, so that the friction coefficient of road surface is not low. Thus, the judgement flag F is reset at step 343.

After executing either step 344 or step 343, step 312 and the following steps (see FIG. 3) are executed so that the engagement of a lock-up clutch 17 is prohibited when the friction coefficient of road surface is low.

Figure 9:
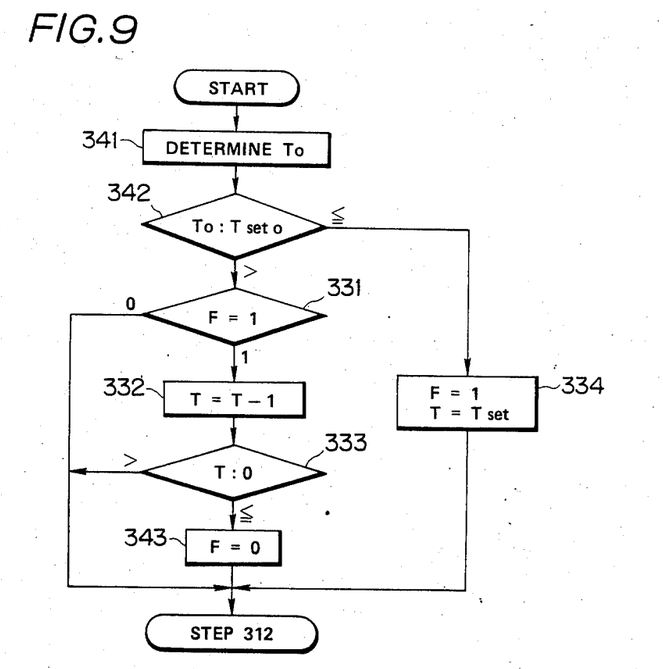
FIG. 9 is a flowchart similar to FIG. 5 illustrating jobs executed in judging road surface condition.

Similarly to FIG. 5, the process shown in FIG. 8 may be improved such that the judgment flag F is reset after lapse of a predetermined delay Tset as will be understood from a flowchart shown in FIG. 9.

Referring to FIG. 9, the flowchart shown herein is different from the flowchart shown in FIG. 8 in that the step 344 (see FIG. 8) has been replaced with step 334 and between the steps 342 and 343 are provided new steps 331, 332, and 333. The new steps 331, 332, 333, and 334 are the same as their counterparts shown in FIG. 5. Thus, the detail description of the flowchart shown in FIG. 9 is omitted.

The process shown in FIG. 8 or FIG. 9 may be improved such that there is provided a hysterisis of judging road surface condition based on the period $T_0$ in order to provide an increased control stability. This is described in connecting with FIGS. 10 and 11.

Figure 10:
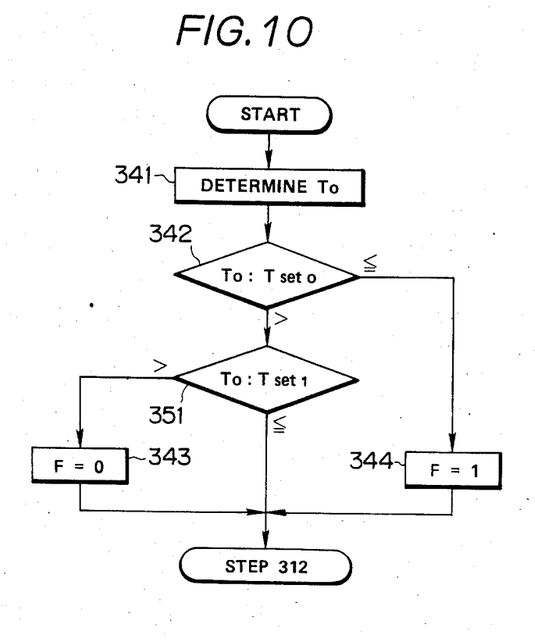
FIG. 10 is a flowchart similar to FIG. 9 illustrating jobs executed in judging road surface condition.
Figure 11:
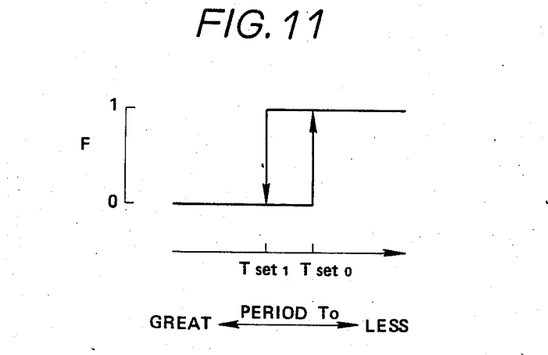
FIG. 11 is a timing diagram illustrating the state of flag F resulting from operation along the flowchart shown in FIG. 10.

Referring to FIG. 10, the flowchart shown herein is different from the flowchart shown in FIG. 8 in the addition of new step 351. At step 351, the period $T_0$ is compared with another predetermined value $Tset_1$ that is greater than the predetermined value $Tset_0$ after it has been decided that $T_0$ is greater than $Tset_0$ at step 342. this causes the judgement flag F to change as illustrated in FIG. 11. As a result, unnecessary repetition of a change of flag F between set state and reset state within a short period of time is prevented from taking place.

What is claimed is:

1. An apparatus for controling engagement of a lock-up clutch of a lock-up type torque converter of an automatic transmission mounted within an automobile having road wheels drivingly connected to the automobile transmission, the apparatus comprising:

means for detecting a road surface condition which provides a friction coefficient, between the road surface and the road wheels, less than a predetermined level and generating an output signal indicative of said road surface condition; and means for prohibiting engagement of the lock-up clutch in response to said output signal.

2. An apparatus as claimed in claim 1, wherein said detecting means includes means for detecting a position assumed by a wiper switch.

3. An apparatus as claimed in claim 1, wherein said detecting means includes a rain drop sensor.

4. A method of controlling engagement of a lock-up clutch of a lock-up type torque converter of an automatic transmission mounted within an automobile having a wiper system operable by a wiper switch having a rest position and an operation position, and road wheels drivingly connected to the automatic transmission, said method comprising the steps of:

detecting a road surface condition which provides a friction coefficient, between the road surface and the road wheels, less than a predetermined level and generating an output signal indicative of said road surface condition; and prohibiting engagement of the lock-up clutch in response to said output signal.

5. A method as claimed in claim 4, wherein said detecting step includes a step of setting a judgement flag upon detecting the operation position assumed by the wiper switch, and a step of resetting said judgement flag upon detecting the rest position assumed by the wiper. switch.

6. A method as calimed in claim 4, wherein said detecting step includes a step of setting a judgement flag upo detecting the operation positoin assumed by the wiper switch, and a step of resetting said judgement flag after lapse of a predetermined delay after the wiper switch has shifted to the rest position from the operation position as long as the wiper switch continues to stay in the rest position for said predetermined delay.

7. A method of controlling engagement of a lock-up clutch of a lock-up type torque converter of an automatic transmission mounted within an automobile having a rain condition dependent wiper system operable in response to a rain drop sensor, and road wheels drivingly connected to the automatic transmission, said method comprising the steps of:

detecting a road surface condition which provides a friction coefficient, between the road surface and the road wheels, less than a predetermined level and generating an output signal indicative of said road surface condition; and prohibiting engagement of the lock-up clutch in response to said output signal.

8. A method as claimed in claim 7, wherein said detecting step includes a step of setting a judgement flag upon detecting a predetermined operation condition of the wiper system, and a step of resetting said judgement flag upon failing to detect the predetermined operation condition of the wiper system.

9. A method as claimed in claim 7, wherein said detecting step includes a step of setting a judgement flag upon detectng a predetermined operation condition of the wiper system, and a step of resetting said judgement flag after lapse of a predetermined delay after the wiper system failed to assume the predetermined operation condition as long as the wiper system continues to fail to assume the predetermined operation condition for said predetermined delay.

* * * * *